United States Patent [19]
Stone

[11] Patent Number: 5,981,101
[45] Date of Patent: Nov. 9, 1999

[54] MODULAR CELL TRAY ASSEMBLY FOR SEALED LEAD-ACID CELLS

[75] Inventor: Bradley William Stone, Yorkville, Ill.

[73] Assignee: GNB Technologies, Inc., Mendota Heights, Minn.

[21] Appl. No.: 08/867,307

[22] Filed: Jun. 2, 1997

[51] Int. Cl.[6] .................................................. H01M 2/10
[52] U.S. Cl. .......................... 429/100; 429/96; 429/97; 429/99; 429/123
[58] Field of Search ................................ 429/96, 97, 99, 429/100

[56] References Cited

U.S. PATENT DOCUMENTS

| | | | |
|---|---|---|---|
| 3,992,225 | 11/1976 | Sykes | 429/1 |
| 5,140,744 | 8/1992 | Miller | 29/790 |
| 5,304,434 | 4/1994 | Stone | 429/99 |
| 5,403,679 | 4/1995 | Stone | 429/99 |
| 5,593,793 | 1/1997 | German | 429/62 |
| 5,667,908 | 9/1997 | Stone | 429/96 |

*Primary Examiner*—Maria Nuzzolillo
*Assistant Examiner*—Monique M. Wills
*Attorney, Agent, or Firm*—Leydig, Voit & Mayer, Ltd.

[57] ABSTRACT

A modular cell tray assembly comprising a series of cell trays stacked one upon the other and each containing a plurality of sealed lead-acid cells is disclosed in which the cell trays provide cell tray interlocks and load distribution structure that satisfy Zone 4 requirements, achieve cell tray interlocking by a boltless pin and provide frontal access to the cells.

16 Claims, 6 Drawing Sheets

FIG. 7

MODULAR CELL TRAY ASSEMBLY FOR SEALED LEAD-ACID CELLS

FIELD OF THE INVENTION

This invention relates to lead-acid cells and to sealed lead-acid cells, and, more particularly, to a modular cell tray assembly for housing such cells.

DESCRIPTION OF THE PRIOR ART

Stationary batteries are specifically designed for float applications, that is, as standby power in the event of a power failure. Stationary batteries are usually maintained at a full-state-of-charge and in a ready-to-use condition typically by floating at a constant preset voltage. Standby batteries are used for standby or operational power in the communications field, utilities, for emergency lighting in commercial buildings and uninterruptible power supplies.

Uninterruptible power supplies are systems that back-up computers and communication networks. Sealed lead-acid cells and/or batteries may comprise the power source. The uninterruptible power source allows for the orderly shut down of computers when there is a sudden interruption in the primary electrical source, such as during a power outage and provides back-up power for communications networks. The uninterruptible power supply also will accommodate short, or intermittent, losses in power. When there is a power interruption, the batteries in the uninterruptible power system can be subject to rapid discharge.

The sealed lead-acid stationary cells and/or batteries used for industrial applications where the power requirements are high and quite demanding are typically comprised of from several to a large number of individual sealed lead-acid cells connected to one another to form a battery with the desired capacity and power requirements. The individual sealed lead-acid cells may be connected in series, in parallel or in suitable combinations of series and parallel to form a battery with the desired capacity and power requirements. External connections are typically made between the negative and positive terminal posts of the respective cells.

For many applications, the lead-acid cells used must be capable of delivering the necessary electrical power at a high rate. Thus, for example, high rate applications may involve discharging the lead-acid cells to an eighty percent depth of discharge in a period of time of from about 1 to 15 minutes or so.

Such applications may require utilizing, for example, anywhere from about 180 to 240 cells or so. At perhaps the other end of the application range, many situations require from about 24 to 48 cells or so.

The weight of lead-acid cells used for such high rate applications can vary considerably. However, each individual cell may, for example, weigh from about 30 to 60 pounds or more.

Because of space considerations, these large capacity cells need to be placed on racks, cabinets or the like in an attempt to minimize the space requirements. Height limitations in some locations also present a problem for providing racks for the number of cells required, given the available floor space.

U.S. Pat. No. 5,304,434 to Stone discloses a highly desirable modular cabinet for large-sized sealed lead-acid cells. Such a modular cabinet is useful for housing cells such as are described in U.S. Pat. No. 5,227,266 to Shaffer et al. wherein such cells have terminals positioned on opposing end walls. The '434 modular cell rack assembly thus provides access to the individual cells, including a central access area in the module.

A complicating factor in designing suitable cabinets and cell tray assemblies is that, for Zone 4 applications, i.e., locations where high seismic conditions can occur, there are stringent requirements that must be met to ensure that the cells are adequately secured in the racks should such high seismic conditions occur. Indeed, from a manufacturing and inventory control standpoint, a cell tray assembly is desirable which can be used in all applications, rather than requiring a design unique for Zone 4 applications.

Still further, two additional factors can complicate the utility of cell tray assemblies for stationary power applications. First of all, such assemblies must be capable of providing access to the cells for periodic testing and the like. Also, because of changing requirements and for other space considerations, it is highly desirable to provide a modular assembly in which individual cell trays can be more readily disassembled, one from the other.

Further, it is necessary to provide a cost-effective cell tray assembly that satisfies the varying, and demanding, criteria as discussed herein. None of the cell racks and assemblies currently available satisfy such objectives.

It is accordingly a principal object of the present invention to provide a modular cell tray assembly capable of housing cells which is adequate to satisfy Zone 4 applications.

A further object is to provide a cell tray assembly for housing cells used for stand-by applications in which each cell is retained in the assembly, yet is readily accessible from the front of the assembly.

Yet another object of the present invention provides a modular cell tray which is inexpensive, may be readily manufactured, and is easy to utilize in the field.

A still further object is to provide modular cell trays which include cell tray interlock structures, accessible from the front of the assembly, and capable of allowing such cell trays to be readily assembled and disassembled.

These and other objects and advantages of the present invention will be apparent upon the following description and drawings. It should be appreciated that the intention is not to limit the present invention to the disclosed embodiments, but, rather, the intention is to cover all embodiments within the scope of the present invention as disclosed and claimed hereinafter. While the present invention has been described primarily in conjunction with lead-acid cells, and particularly sealed lead-acid cells and batteries, it should be appreciated that the present invention can be utilized to house cells and batteries of other types, if desired.

SUMMARY OF THE INVENTION

In accordance with the present invention, there is provided a modular cell tray assembly comprising a series of cell trays stacked one upon the other to provide an assembly capable of adequately satisfying the requirements for Zone 4 applications. Each of such cell trays comprise a base, a top and upstanding side walls dimensioned to provide a cell-receiving area satisfactory to typically accommodate anywhere from two or three to six or more cells. Each cell tray includes discontinuous cell interlocks located adjacent the top and bottom of the side walls which are discontinuous and which are complementally sized to form a cell tray interlock when one cell tray assembly is stacked upon another. Such cell tray interlocks are likewise sized to accommodate an interlock pin which can be slidably positioned in the cell interlocks and is capable of being accessed from the front of the cell tray. Each cell tray likewise includes cell restraint structure which retains the cells in the desired location, yet which provides access to the cells from the front of the assembly. Stackability is further enhanced, as well as assisting in satisfying the Zone 4 applications, by including load distributing structure.

In this fashion, cell trays can be provided which are not only cost-effective, but also readily satisfy Zone 4 applications.

DETAILED DESCRIPTION OF THE INVENTION

Figure 1:
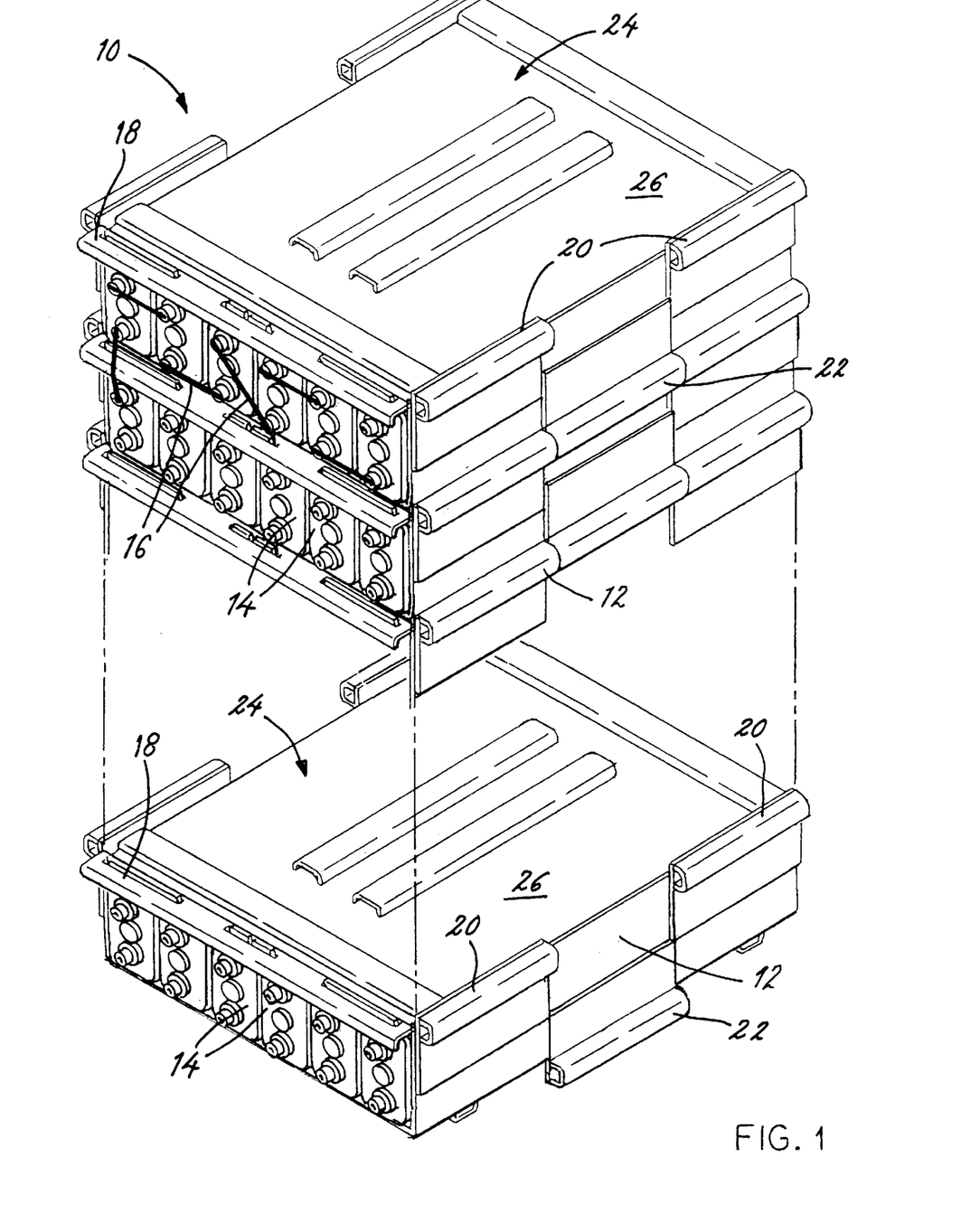
FIG. 1 is a partial isometric view and showing one preferred embodiment of the modular cell trays of the present invention in a stacked, assembled position.
Figure 2:
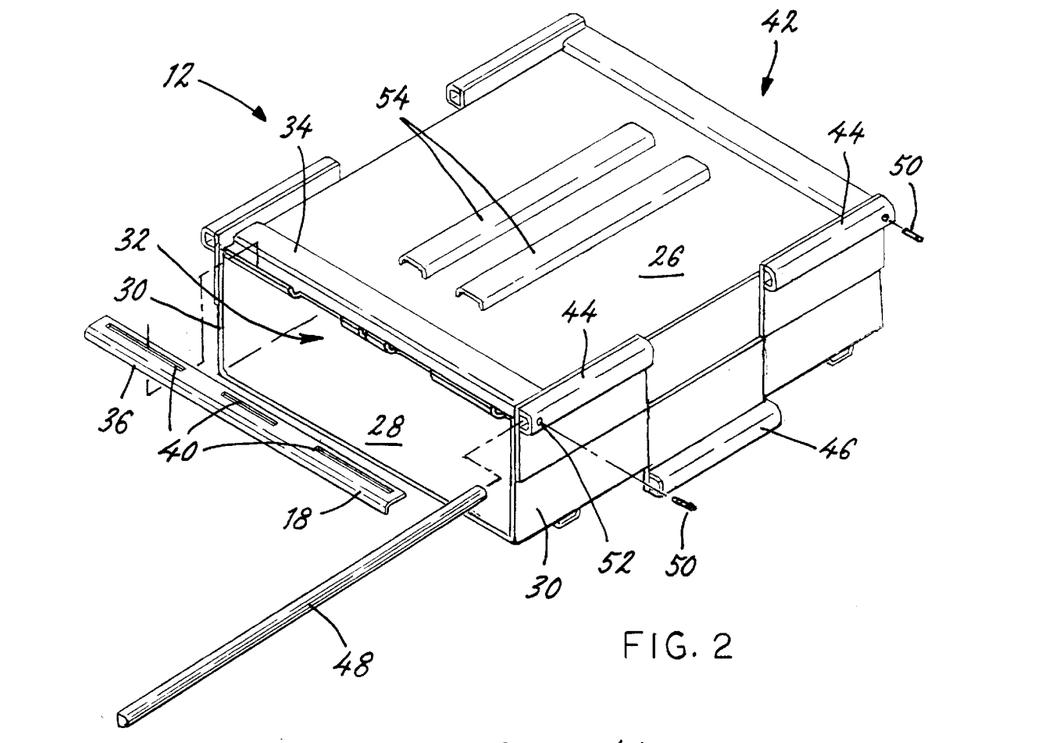
FIG. 2 is an exploded, frontal isometric view of one of the modular cell trays shown in FIG. 1 and further illustrating the cell restraint, interlock pin, cell interlock structure, and the load-distribution structure.
Figure 3:
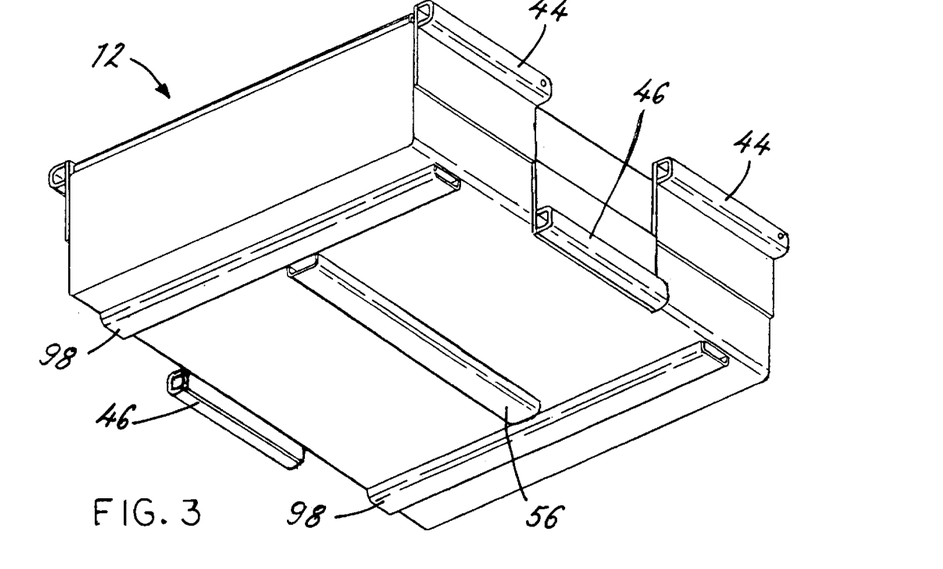
FIG. 3 is a bottom isometric view of the modular cell tray assembly as shown in FIG. 2 and illustrating the load-distribution and alignment structure located on the bottom of the modular cell tray.

FIGS. 1–3 show one embodiment of the modular cell tray assembly of the present invention which comprises a series of the novel modular trays interlocked together in a manner allowing ready service and access as will be described hereinafter. Thus, as shown in FIG. 1, the modular cell tray assembly, shown generally at 10 comprises a series of stacked modular trays 12.

Each modular cell tray 12 houses a plurality of lead-acid cells or batteries 14. While the tray embodiment shown in FIG. 1 shows six lead-acid cells being housed in each tray, this number can vary as desired for the intended application, as can the type of connector used to electrically connect individual cells or batteries together. However, for most applications, it will generally be suitable to size the cell tray to accommodate anywhere from 2 to about 6 cells.

More particularly, depending upon the electrical capacity and requirements for the particular application, the electrical connections between the cells in the assembly may be in series, parallel, or both. As one illustration, connectors 16 show the manner in which the cells shown in the top modular tray 12 are electrically connected together, and then to the adjacent tray in the stack.

Pursuant to one aspect of the present invention, and as will be described more particularly hereinafter, each modular cell tray 12 also includes cell restraint structure 18 which holds the cells 14 in the desired position, cell tray interlock structure 20 and 22 (positioned as will be described more particularly hereinafter) as well as load distribution structure 24 (positioned on the top 26 of the tray and on the bottom of each tray as will be described in conjunction with FIGS. 2 and 3).

As is perhaps best shown in FIGS. 2 and 3, each modular cell tray 12 comprises a top 26, base 28 and side walls 30 joining the top 26 and base 28 to define the cell-receiving area, shown generally at 32. If desired, sides 30 can be formed integrally with either the base 28 (as is shown) or the top 26. Further, if desired, the cell-receiving area 32 can be divided by partitions into a series of cell-receiving areas for a single cell.

While the sides 30, when the cell-receiving areas are filled with the required number of cells, prevent side-to-side movement of the cells within the trays, cell restraint structure is needed to ensure that the cells are held in place so that undesired front-to-back movement in the cell tray is avoided. Any type of cell restraint structure can be used, attached to the top 26, the base 28, the upstanding sides 30, or, when used, to the individual tray cell partitions.

In the illustrative embodiment, the front of the cell tray, indicated generally at 34, terminates in an upstanding, discontinuous lip 36, over which the cell restraint 18 hangs (as is best seen in FIG. 1). In this embodiment, cell restraint 18 can be readily assembled, simply by aligning the slots 40 in the cell restraint 18 with the upstanding discontinuous lip sections 36 and then dropping the cell restraint in place. While effective to hold the cells in their proper position within the tray, the cell restraint 18 can be readily lifted off so that the individual cells can be removed, as may be desired for servicing or replacement.

FIGS. 2 and 3 show the cell restraint structure for the front 34 of the cell tray 12. Desirably, the back 42 of the tray will include cell restraint structure in similar construction to that used for the front 34 of the cell (the cell restraint structure for the back not being showed for simplicity). As may be appreciated, using the same structure facilitates assembly and reduces the inventory requirements. However, any desired cell restraint structure can be used, and the front and back of each cell do not need to utilize the same cell restraint structure.

In accordance with a further aspect of the present invention, each modular cell tray 12 has cell interlock structure which allows a series of trays to be stacked, one upon the other, and allowing the resulting, assembled stack of trays to be readily interlocked in a fashion that will satisfy the necessary Zone 4 seismic requirements. To this end, and as shown in FIGS. 2 and 3, each side of the tray 12 includes channel sections 20, adapted to interlock with a complementally-shaped channel section 22 of the tray which is stacked upon such tray. Channel sections 20 are thus located adjacent the top 26 of the cell tray, while the channel section 22 is positioned adjacent the base 28 of the cell tray. When stacked in assembled position as is shown in FIG. 1, by way of illustration, the top tray in the cell assembly stack has its central channel section 22 complementally shaped to interlock with channel sections 20 of the adjacent tray 12 in the assembled stack.

As may be appreciated, the respective cell tray interlock structure does not have to form a continuous channel in which the slide pin is inserted. Accordingly, while the embodiment shown (forming a continuous channel) facilitates alignment during assembly, all that is functionally required for the cell tray interlock structure is that such structure be sufficiently structurally sound to satisfy Zone 4 applications.

In accordance with the present invention, the stacked cell tray assembly 10 can be readily interlocked by use of a slide interlock pin 48 (FIG. 2). Such interlock slide pins 48 can be any shape as desired so as to be capable of being slid into and out of the channel formed by channel sections 20 and 22.

If desired, each interlock slide pin 48 can be held in place by any means desired. It is useful to provide such structure adjacent the front 34 of the cell tray, and, usually, the back of the cell tray 42. A suitable structure can include hitch pins 50 which can be slid into and out of apertures 52 (as best seen in FIG. 2). Any other type of pin such as a Cotter pin, may likewise be used.

As may be appreciated, inventory simplification may make it desirable to form apertures 52 in each end of channel sections 20 and 22. With this structure, only one part need be inventoried and can be used for either front, back, or bottom channel sections.

Yet another aspect of the present invention provides load distribution structure so that the stacked modular cell tray assembly with the cells in position will have the load distributed throughout the structure to satisfy seismic and other considerations (e.g., allowing use of thinner materials and smaller fabrication equipment so that the cell tray assembly and fabrication are cost-effective). To this end, and as is shown in FIGS. 1–3, the top 26 of the cell 12 includes elongate channels 54 which span the majority of the distance from the front 34 to the back 42 of the cell tray 12. Any number of elongate channels can be used, two being adequate, particularly when the load distribution structure on the bottom 28 of the cell is considered. The bottom 28 of the cell tray 12 thus includes channel 56 running from the front of the cell tray to the back 42 as well as elongate channels 58, spanning across the width of the cell tray.

In this fashion, the composite load distribution structure located on the top and bottom of each cell tray, respectively, together cooperate to adequately distribute the load of the cell tray assembly so as to satisfy the necessary requirements. The particular configuration for the load distribution structure can be varied as desired, so as long as the resulting criteria is satisfied.

A further aspect of the load distribution structure is that adequate thermal management of the cell tray assembly should be provided. This can be achieved by insuring that adjacent trays are separated, one from another, by at least about ¼-inch or so. In this fashion, the air flow between adjacent trays will allow adequate thermal management to avoid overheating which could lead to premature failure of the battery system and/or thermal runaway.

In the most preferred embodiment, the elongate channels 54 located on the top of each cell tray 12 are spaced apart from one another so as to accept in the space therebetween, elongate channel 56 from the tray stacked atop that tray. This complemental shaping and positioning facilitates alignment and stacking of the cell trays, one upon the other. Indeed, the shape and positioning of elongate channels 58 further facilitate alignment, these channels being sized to fit tightly between the interlock channels 20.

In keeping with this invention, the positioning, location, and shape of the respective interlock channel sections can be varied as desired. As a further illustrative example, the central interlock channel section 22 could be located adjacent the top 26 of the cell tray 12 while the interlock channel sections 20 could be located adjacent the bottom 28 of the cell tray 12. However, the illustrative embodiment is considered to be advantageous in that alignment can be facilitated during the stacking of the cell trays, one upon another, to form the desired cell tray assembly.

The modular cell tray assembly shown in FIGS. 1–3 provides a highly desirable, functional assembly which amply satisfies the various criteria for seismic and other applications. Each cell tray can be made of whatever material is desired, particular steels being highly desirable. Illustrative useful materials include carbon steel, stainless steel, any of the high-strength alloy steels, aluminum and aluminum alloys. The thickness requirements of the selected material for construction can be selected readily, based upon the material strength as is known.

A further and important aspect of the present invention provides an embodiment which minimizes the inventory requirements for the cell trays while facilitating fabrication to provide an extremely cost-effective cell tray, yet satisfying the requisite criteria for seismic and other applications. As is thus shown in FIGS. 4–7, the illustrative cell tray assembly 70 provides a cost-effective tray assembly which simplifies inventory and fabrication.

Figure 4:
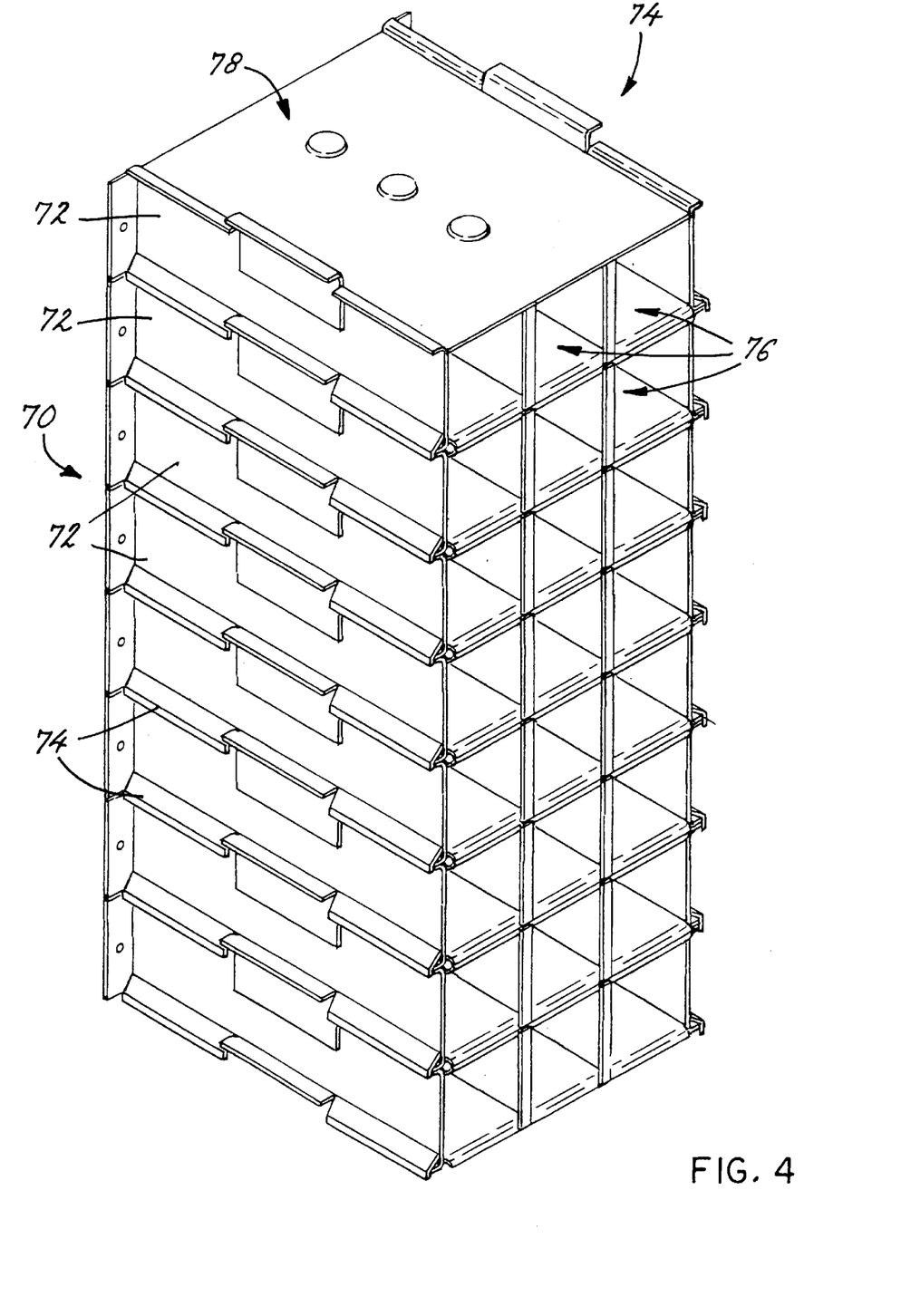
FIG. 4 is a partial isometric view similar to FIG. 1 and showing another preferred embodiment of the modular cell trays of the present invention in a stacked, assembled position.

To this end, FIG. 4 shows a modular cell tray assembly 70 comprising a series of cell trays 72. In general, each cell tray 72 has cell interlock structure shown generally at 74 and a plurality of cell-receiving areas 76. Further, each cell tray 72 has thermal management structure 78.

Figure 5:
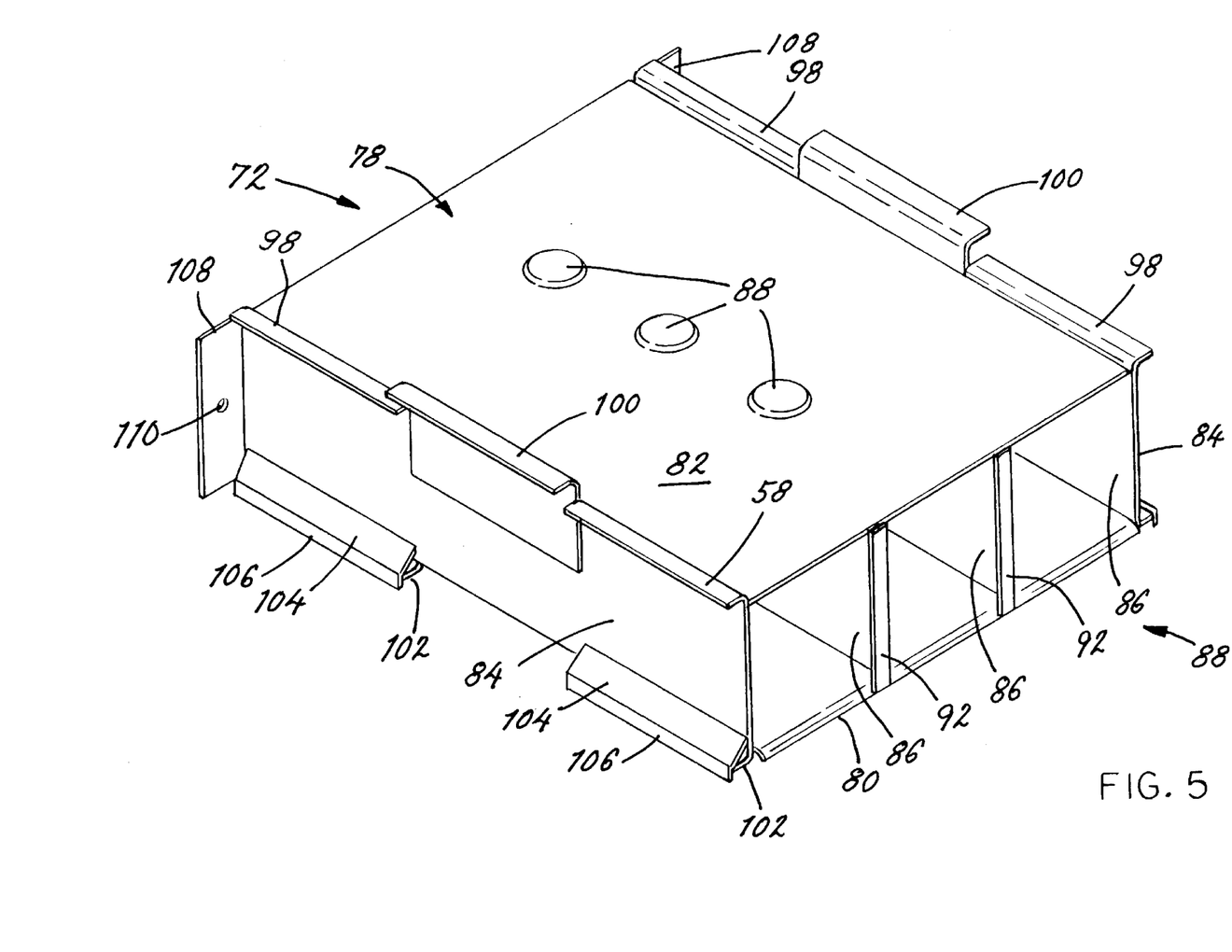
FIG. 5 is a frontal, top isometric view of one of the modular cell trays shown in FIG. 4 and illustrating the spacing structure located on the top of the cell tray, the cell restraints, and the interlock pin structure.
Figure 6:
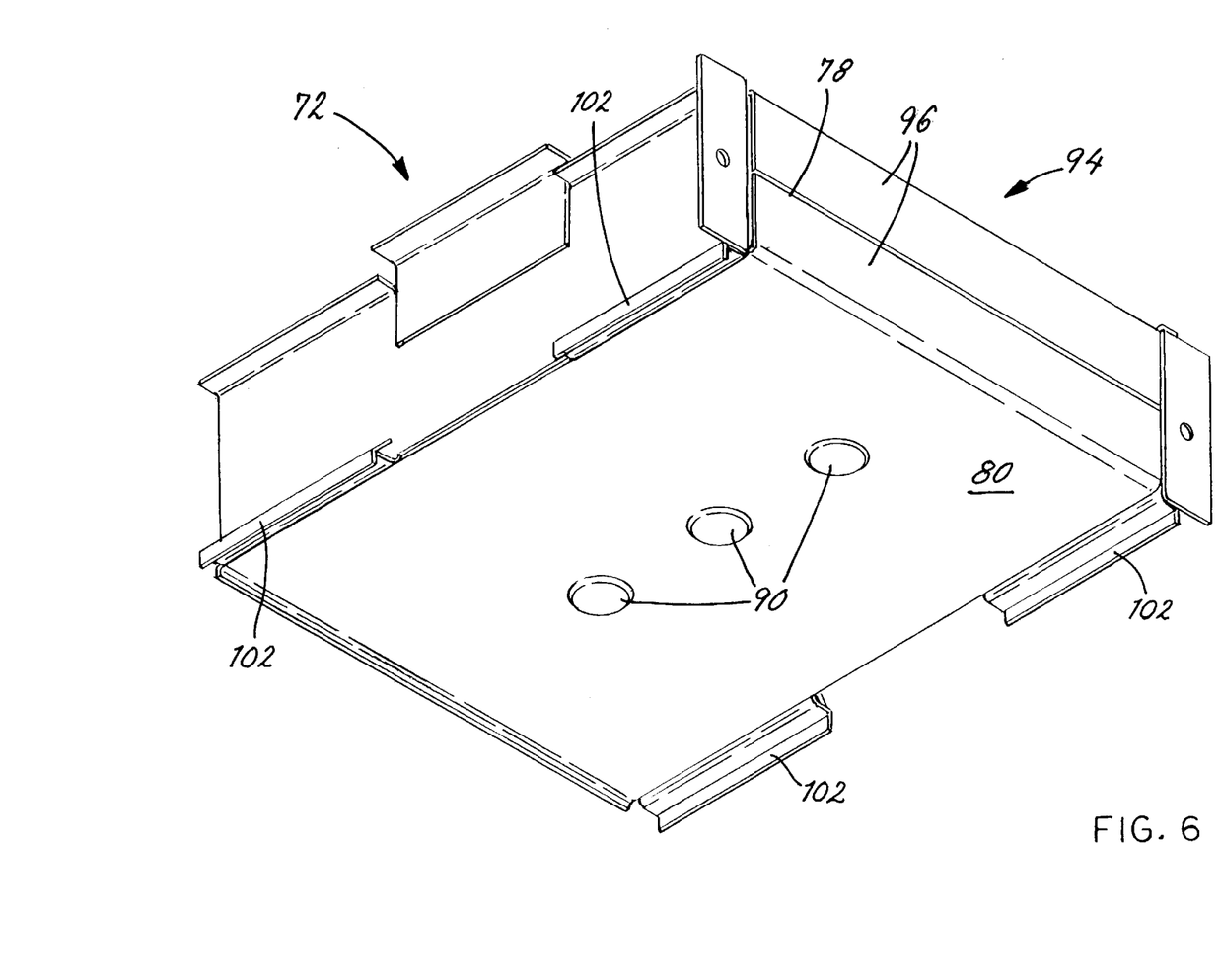
FIG. 6 is a bottom, rear isometric view and showing the spacing structure located on the bottom of the tray and the configuration of the back of the modular cell tray.

As best seen in FIGS. 5 and 6, each modular cell tray 72 comprises a base 80, a top 82 and upstanding side walls 84. Each cell-receiving area 76 is formed by partitions 86 sized to allow an individual lead-acid cell (selected for the particular application) to fit snugly therein. This is particularly desirable when the cells are of the sealed lead-acid type (viz., valve-regulated lead-acid cells). Thus, as is known, it is desirable to maintain appropriate plate-to-plate spacing during use and to avoid, or at least minimize, bulging of the walls of the container which would impair such desired plate-to-plate spacing and, thus, the desired electrical performance.

In the most preferred aspects of the modular cell tray embodiment shown in FIGS. 4–7, inventory and fabrication can be simplified by minimizing the number of parts and by maximizing utilization of the stainless steel or other material from which the cell tray parts are manufactured. To this end, in the most preferred embodiment of the present invention, the upstanding side walls 84 are identical to each other, as are base 80 and top 82. In this fashion, only two components need to be inventoried, as well as the cell restraints and cell interlock structure components, as discussed hereinafter.

The thermal management structure 78 can suitably comprise a series of embossments 88 located on the top 82 (FIG. 5) and 90 located on the base 80 (FIG. 6). In the most preferred embodiment of this cell structure, the embossments 88 and 90 can be formed by known metal working techniques and are thus integral with the base 80 and top 82.

Indeed, as previously noted, when it is desired to simplify inventory, the base 80 and top 82 can be formed identically. With the typical thicknesses of stainless steel and the like used to accommodate the respective weight of lead-acid cells, metal working techniques can achieve embossments having heights above the respective surface of the top and base of only up to about 0.180 inch. Accordingly, to provide the desired thermal management from cell tray-to-cell tray, a minimum of 0.25 inches or so is required. Thus, the embossments 88 and 90 should align when the cell trays 72 are stacked, one upon the other, in assembled fashion. Such embossments 88 and 90 also provide rigidity to the overall cell tray structure.

To provide the cell restraint structure to retain each cell in its desired position and preventing front-to-back movement or the like within each cell-receiving area 76, the cell tray 72 provide cell restraint structure. As is thus shown in FIGS. 5 and 6, the front of the cell tray 72, indicated by arrow 88 (FIG. 5), includes front cell restraints 92 which can be attached to the cell partitions 86 by screws or the like. Any means of attachment can be used as is desired. However, to allow removal of individual cells, it is most desirable to use attachment means which allow ready removal when cell replacement or the like is desired. In the most preferred embodiment of this cell structure, and to minimize inventory requirements, the cell restraints 92 can be cut out of cell partitions 86.

More particularly, all that is required for the cell restraints is a sufficient width such that the cell restraint extends into the cell-receiving area 76 sufficiently so that a cell will not slide out of the front 88 of the cell tray 72. The width of the cell restraints 92 is sufficiently narrow so that removal from the cell partitions 86 will not detract from the function of the cell partition (i.e., maintaining the desired plate-to-plate spacing).

While similar cell restraint structure could be used at the back of the cell tray 72, the illustrative embodiment (as best seen in FIG. 6) shows that the back 94 of the cell tray 72 comprises rear cell restraint structure 96. Such rear cell restraint structure 96 can desirably consist of extensions of the base 80 and the top 82. Desirably, when assembled into the tray, the rear cell restraint structure will leave a gap 96 of at least about 0.125 inch or so. The particular size of the gap 96 is not critical. However, by providing a specification for the gap of about 0.125 inch or so, the tolerances in forming the base 80 and the top 82 (the identical piece in the most preferred embodiment) are widened, thereby facilitating fabrication.

In the cell tray embodiment shown in FIGS. 4–7, the cell restraint structure is simplified. To this end, and as is shown in FIGS. 4–7 (and as may be best seen in FIG. 7), the cell tray interlock structure located adjacent the top 82 of each cell tray 72 comprises end interlock sections 98 which are integrally formed with the upstanding sides 84 and a central interlock structure section 100 spaced from the end cell interlock structure sections 98 so as to allow a slide pin or the like to interlock the cell trays together when they are in a stacked, assembled condition.

Figure 7:
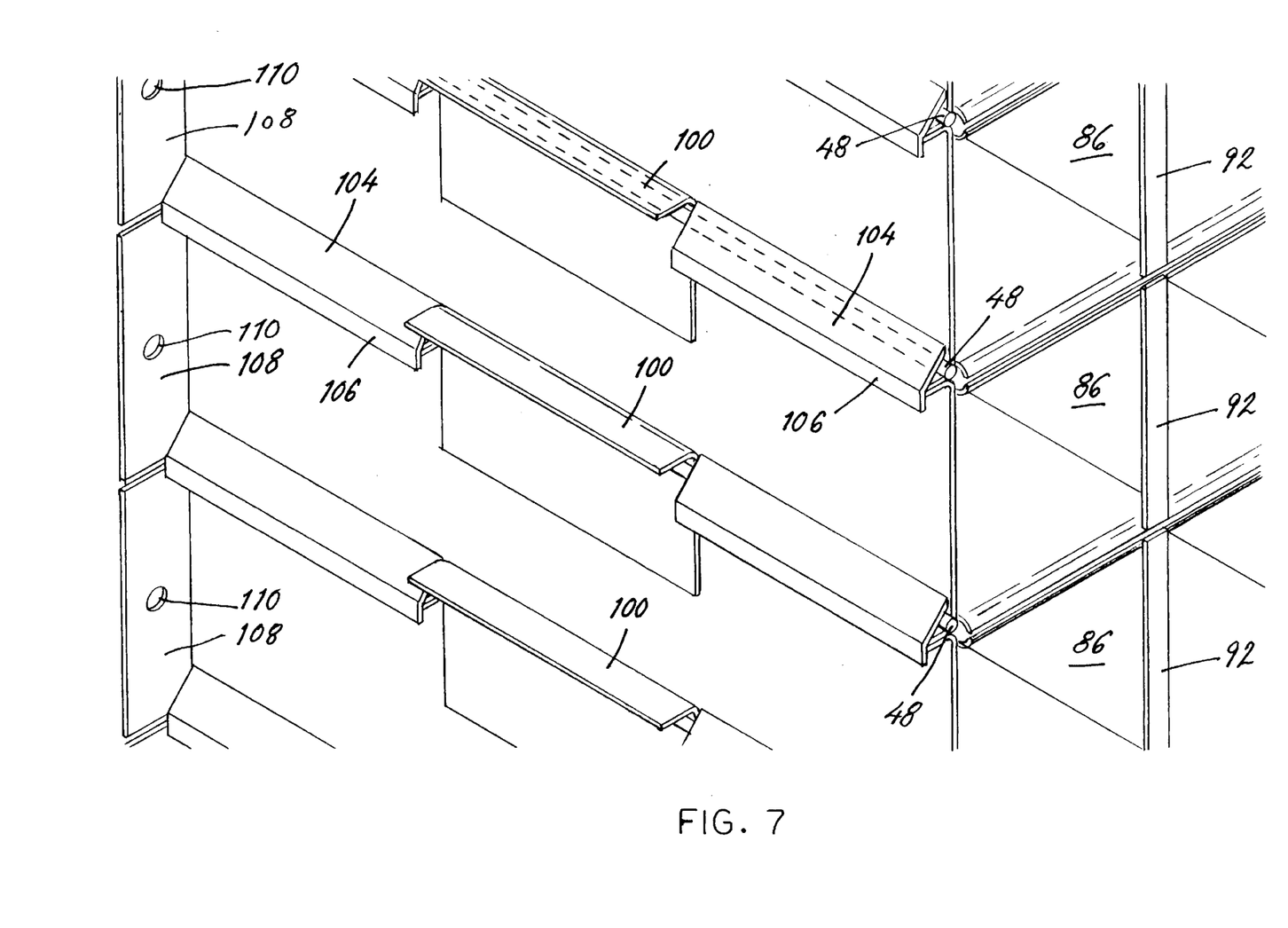
FIG. 7 is a partial isometric view similar to FIG. 4 and illustrating the cell interlock structure located on each side of the modular cell trays.

Located adjacent the base 80 of the cell tray 72 are end channel interlock structure sections 102 (as best seen in FIGS. 6 and 7) and angular cell interlock sections 104 having downwardly extending stress distribution legs 106, such legs 106 (as best seen in FIG. 7) extending downwardly past the base 80 of the tray so that such legs contact the top end interlock structure 98.

In this fashion, some load distribution is achieved. Thus, in addition to allowing facile interlock of the cell trays when stacked in their assembled position, the cell interlock sections 104 also carry out a load distribution function.

As an optional feature, the upstanding sides 84 can be formed with ears 108 having an aperture 110. This type of structure can be used, if desired, to provide a ready means for attaching an assembled cell tray stack to a pallet or the like during transportation.

Such ear structure can also be used to prevent the interlock slide pin from exiting the rear of the channel. Also, as was the case with the first embodiment, a hitch pin or the like (together with a suitable positioned aperture) should be used to prevent undesired movement of the slide pin out of the front of the channel.

As may be thus appreciated, when the embodiment of FIGS. 4–7 is used, a minimum number of parts needs to be inventoried, and assembly into a cell tray is simplified and is cost-effective. Thus, in addition to identical base and tops and sides, all that is required for inventory purposes are material for cell partitions 86, central cell interlock structure 100, and end cell interlock sections 104. The ready assembly and cost effectiveness of this embodiment can be thus appreciated. The materials of construction for the cell trays can be as described for the cell tray of FIGS. 1–3.

Thus, as has been seen, the present invention provides a cell tray assembly which can be readily interlocked, cell tray-to-cell tray. The embodiment of FIGS. 1–3 show a structure in which load distribution is amply satisfied, while the embodiment shown in FIGS. 4–7 provides a cost-effective structure with a minimum of parts. In keeping with the present invention, the respective structure shown can be modified as desired, while still satisfying the criteria described herein.

I claim:

1. A modular cell tray assembly for stationary power applications comprising a plurality of cell trays stacked one on top of another, each cell tray comprising a base, upstanding side walls and a top, each having an inner and outer surface, the respective inner surfaces defining a cell-receiving area having a front and back and sized to accommodate a plurality of sealed cells, a plurality of sealed cells positioned in said cell-receiving area, at least one of said base, side walls and top having cell restraint structure restraining said cells from front and back movement in said cell-receiving area, at least one of said cell tray side walls having cell tray interlock sections adjacent the top and base, said cell tray interlock sections extending from essentially the front to the back of the cell-receiving area and each being discontinuous and complementally sized such that the cell tray interlock section adjacent the base of a first cell tray joins with the top cell tray interlock section of a second cell tray upon which the first cell tray is stacked to form a cell tray interlock, said cell tray interlock providing a channel capable of accepting a cell restraint pin, the outer surfaces of the top and base of each cell having a load-distributing structure sized and positioned such that the load-distributing structure in the first cell tray accepts the base load-distributing structure of the second cell tray upon which the first cell tray is stacked, and a cell restraint pin slidably positioned in each channel of said cell tray interlocks and capable of being accessed from the front of the cell tray.

2. The tray assembly of claim 1, wherein said assembly has Zone 4 acceptability.

3. The tray assembly of claim 1, wherein each of said cell restraint pins is prevented from slidable movement in said channel by a boltless pin accessible from the front of each cell tray.

4. The tray assembly of claim 3, wherein said boltless pin is a hitch pin.

5. The tray assembly of claim 1, wherein said load distribution structure on the top of each cell tray comprises two channel sections, said load distribution structure on the bottom of each cell tray comprises a channel section sized and located to fit between said pair of channel sections on the top of the cell tray upon which the cell tray is stacked, said channel sections spacing adjacent cell trays from each other by a distance of at least about 0.25 inch.

6. The tray assembly of claim 5, wherein said load distribution structure on the bottom of each tray includes channel sections adjacent the front and back of the cell tray base and extending from one side of the cell tray to the other.

7. The tray assembly of claim 1, wherein said top and base of each of said cell trays is identical, and said top and base each having integral embossments of less than 0.25 inch in height and being located to align and space adjacent cell trays at least 0.25 inch from each other.

8. The tray assembly of claim 1 wherein, said cell-receiving area has partitions dividing said area into at least two areas, each sized to receive an individual cell.

9. The tray assembly of claim 8, wherein the top and base of each cell tray form a rear wall having a gap, said cell partitions are discontinuous and at least some of the material from said partitions creating the discontinuities are removably attached to the partitions adjacent the front of said cell trays to prevent forward movement of the cells.

10. The tray assembly of claim 8, wherein said cell tray sides are identical, each having integral outwardly extending sections adjacent the top and bottom of each tray and a separate section creating said channel interlock structure.

11. A modular cell tray assembly for stationary power applications comprising a plurality of cell trays stacked one on top of another, each cell tray comprising a base, upstanding side walls and a top, each having an inner and outer surface, the respective inner surfaces defining a cell-receiving area having a front and back and sized to accommodate a plurality of sealed cells, a plurality of sealed cells positioned in said cell-receiving area, at least one of said base, side walls and top having cell restraint structure restraining said cells from front and back movement in said cell-receiving area, at least one of said cell tray side walls having cell tray interlock sections adjacent the top and base, said cell tray interlock sections extending from essentially the front to the back of the cell-receiving area and each being discontinuous and complementally sized such that the cell tray interlock section adjacent the base of a first cell tray joins with the top cell tray interlock section of a second cell tray upon which the first cell tray is stacked to form a cell tray interlock, said cell tray interlock providing a continuous U-shaped channel capable of accepting a cell restraint pin, the outer surfaces of the top and base of each cell having a load-distributing structure sized and positioned such that the load-distributing structure in the first cell tray accepts the base load-distributing structure of the second cell tray upon which the first cell tray is stacked, and a cell restraint pin slidably positioned in each channel of said cell tray interlocks and capable of being accessed from the front of the cell tray.

12. The tray assembly of claim 11, wherein said assembly has Zone 4 acceptability.

13. The tray assembly of claim 11, wherein each of said cell restraint pins is prevented from slidable movement in said channel by a boltless pin accessible from the front of each cell tray.

14. The tray assembly of claim 11, wherein the front of said tray terminates in an upstanding, discontinuous lip and said cell restraint comprises a base having slots aligned with said upstanding, discontinuous lip and capable of being mounted thereon and having a downwardly extending lip preventing frontward movement of said cells.

15. A modular cell tray assembly for stationary power applications comprising a plurality of cell trays stacked one on top of another, each cell tray comprising a base, upstanding side walls and a top, each having an inner and outer surface, the respective inner surfaces defining a cell-receiving area having a front and back and sized to accommodate a plurality of sealed cells, a plurality of sealed cells positioned in said cell-receiving area, at least one of said base, side walls and top having cell restraint structure restraining said cells from front and back movement in said cell-receiving area, at least one of said cell tray side walls having cell tray interlock sections adjacent the top and base, said cell tray interlock sections extending from essentially the front to the back of the cell-receiving area and each being discontinuous and complementally sized such that the cell tray interlock section adjacent the base of a first cell tray joins with the top cell tray interlock section of a second cell tray upon which the first cell tray is stacked to form a cell tray interlock, said cell tray interlock providing a channel capable of accepting a cell restraint pin, said cell tray interlock sections comprising U-shaped channel members located adjacent the front and back surface of the tray and a central interlock section spaced from said channel members and having a downwardly extending stress distribution leg, the outer surfaces of the top and base of each cell having a load-distributing structure sized and positioned such that the load-distributing structure in the first cell tray accepts the base load-distributing structure of the second cell tray upon which the first cell tray is stacked, and a cell restraint pin slidably positioned in each channel of said cell tray interlocks and capable of being accessed from the front of the cell tray.

16. The tray assembly of claim 15, wherein the top and base have a plurality of embossments providing separation of adjacent, stacked trays of at least about one-fourth inch.

* * * * *